(12) United States Patent
Terakado et al.

(10) Patent No.: US 7,584,492 B2
(45) Date of Patent: Sep. 1, 2009

(54) PROGRAM-SELECTION DEVICE, PROGRAM SELECTION METHOD, AND PROGRAM INFORMATION PROVIDING SYSTEM

(75) Inventors: Tomoko Terakado, Kanagawa (JP); Yoshinori Ebi, Tokyo (JP)

(73) Assignee: Sony Corporation, Tokyo (JP)

( * ) Notice: Subject to any disclaimer, the term of this patent is extended or adjusted under 35 U.S.C. 154(b) by 963 days.

(21) Appl. No.: 10/479,513

(22) PCT Filed: Apr. 3, 2003

(86) PCT No.: PCT/JP03/04278

§ 371 (c)(1),
(2), (4) Date: Dec. 10, 2003

(87) PCT Pub. No.: WO03/088657

PCT Pub. Date: Oct. 23, 2003

(65) Prior Publication Data

US 2004/0158861 A1 Aug. 12, 2004

(30) Foreign Application Priority Data

Apr. 12, 2002 (JP) ............................. 2002-111308

(51) Int. Cl.
*H04N 7/16* (2006.01)
*H04N 5/445* (2006.01)
(52) U.S. Cl. ......................................... 725/53; 725/137
(58) Field of Classification Search ................... 725/53, 725/137
See application file for complete search history.

(56) References Cited

U.S. PATENT DOCUMENTS

| 5,619,247 | A | 4/1997 | Russo |
| 6,005,565 | A | 12/1999 | Legall et al. |
| 6,169,543 | B1 * | 1/2001 | Wehmeyer .................... 725/47 |
| 7,055,168 | B1 * | 5/2006 | Errico et al. ................... 725/46 |
| 7,080,395 | B2 * | 7/2006 | Takahashi et al. ............. 725/44 |
| 2001/0027557 | A1 | 10/2001 | Shinkawa et al. |
| 2001/0048752 | A1 * | 12/2001 | Miki et al. ................... 382/100 |
| 2003/0172382 | A1 * | 9/2003 | Kim ............................. 725/53 |
| 2003/0200545 | A1 * | 10/2003 | Nakada ........................ 725/53 |
| 2004/0073926 | A1 * | 4/2004 | Nakamura et al. ............ 725/53 |

(Continued)

FOREIGN PATENT DOCUMENTS

EP 0 774 868 A1 5/1997

(Continued)

*Primary Examiner*—Christopher Kelley
*Assistant Examiner*—Franklin S Andramuno
(74) *Attorney, Agent, or Firm*—Oblon, Spivak, McClelland, Maier & Neustadt, P.C.

(57) ABSTRACT

A program-selecting apparatus well applied to a broadcast receiving set sets automatic picture-recording by setting program selection conditions comprising a genre, a keyword, and a time zone. A recording medium built in a recording medium unit has a storage region for storing keywords used in this setting. This storage region is comprised of a fixed region in which plural fixed keywords are stored and an alteration region in which plural alterable keywords are stored. A keyword stored in the alteration region is downloaded through a MODEM from a server based on, for example, user's operations. It is possible to set a program selection condition by using a new keyword without providing input means such as a keyboard for inputting keywords to the apparatus, thus making the apparatus inexpensive.

20 Claims, 7 Drawing Sheets

U.S. PATENT DOCUMENTS

2004/0158861 A1 * 8/2004 Terakado et al. .............. 725/52

FOREIGN PATENT DOCUMENTS

| JP | 11-41566 | 2/1999 |
| JP | 2001-36846 | 2/2001 |
| JP | 2001-257961 | 9/2001 |
| WO | WO 02/03671 A1 | 1/2002 |

* cited by examiner

FIG. 2

| FIXED REGION | SOCCER |
| | GOLF |
| | BASEBALL |
| | NEW PROGRAM (NEW) |
| | STEREO BROADCAST (STEREO) |
| | BI-LINGUAL (BI-LINGUAL) |
| | SERIAL DRAMA (SERIAL NUMBER OF CONSECUTIVE BROADCASTING) |
| | MOVIE |
| | LIVE PERFORMANCE |
| | MUSIC |
| | GUEST |
| | ENTERTAINMENT (!) |
| | SPECIAL |
| | CUSTOMIZED |
| | COOKING |
| | NEWS |
| ALTERATION REGION | WORLD CUP |
| | OLYMPICS |
| | BEACH VOLLEYBALL |
| | WINE |
| | DIET |
| | SUMMER |
| | GOURMET |
| | RE-BROADCAST (RE-BROADCAST) |

FIG. 3

| PROGRAM ID | PROGRAM ID DATA (CODE) |
|---|---|
| BROADCAST STATION No. | CHANNEL DATA (CODE) |
| BROADCAST STATION NAME | TEXT DATA |
| START TIME | TIME DATA |
| TIME LENGTH (OR END TIME) | TIME DATA |
| PROGRAM TITLE | TEXT DATA |
| PROGRAM SUBTITLE | TEXT DATA |
| PROGRAM EXPLANATION | TEXT DATA |
| GENRE | GENRE DATA (CODE) |

FIG. 4

SIMPLE SETTING

LEAVE-TO-YOUR-CHOICE PICTURE-RECORDING SETTING ( DRAMA )   ( SPORTS )   ( MUSIC )

( VARIETY )   ( MOVIE )   ( NOT PICTURE-RECORDING )

TELL ME YOUR FAVORITE GENRE.
WHEN A GENRE IS SELECTED, A PROGRAM OF THE GENRE IS RETRIEVED AND RECORDED. IF YOU HAVE NO GENRE OF WHICH CONTENTS YOU WANT TO RECORD IN PARTICULAR, SELECT "NOT PICTURE-RECORDING".

CHOOSE BY ⇧, ⇩, ⇦, AND ⇨ KEYS AND SELECT BY
DETERMINE KEY.

FIG. 5

| GENRE SELECTED BY SIMPLE SETTING | | GENRE | KEYWORD | TIME ZONE |
|---|---|---|---|---|
| DRAMA | ③ | DRAMA | NEW | |
| | ④ | DRAMA | RE-BROADCAST | |
| | ⑤ | DRAMA | STEREO | NIGHT |
| SPORTS | ③ | SPORTS | SOCCER | |
| | ④ | SPORTS | BASEBALL | |
| | ⑤ | SPORTS | | |
| MUSIC | ③ | MUSIC | | NIGHT |
| | ④ | MUSIC | | LATE NIGHT |
| | ⑤ | | MUSIC | |
| VARIETY | ③ | VARIETY | SPECIAL | |
| | ④ | VARIETY | ! | |
| | ⑤ | VARIETY | GUEST | |
| MOVIE | | | | |
| | ④ | MOVIE | | |
| | ⑤ | | MOVIE | |

FIG. 6

| PRIORITY ORDER | GENRE | KEYWORD | TIME ZONE |
|---|---|---|---|
| 1 | | | |
| 2 | | | |
| 3 | DRAMA | NEW PROGRAM | NOT SPECIFIED |
| 4 | DRAMA | RE-BROADCAST | NOT SPECIFIED |
| 5 | DRAMA | STEREO BROADCAST | NIGHT (6:00PM - 12:00AM) |

FIG. 7

♡ LIST FOR AUTO PROGRAM RECOMMENDATION DEPENDING ON USER'S PREFERENCE

| 1 | | | |
|---|---|---|---|
| 2 | | | |
| 3 | DRAMA | NEW PROGRAM | NOT SPECIFIED |
| 4 | DRAMA | RE-BROADCAST | NOT SPECIFIED |
| 5 | DRAMA | STEREO BROADCAST | NIGHT (6:00PM – 12:00AM) |

CHOOSE BY ⇧ AND ⇩ KEYS AND SELECT FUNCTION BY DETERMINE KEY        END BY TODAY

FIG. 8

♡ PICTURE-RECORDING SETTING FOR AUTO PROGRAM RECOMMENDATION DEPENDING ON USER'S PREFERENCE

| GENRE | |
| KEYWORD | |
| TIME ZONE | |

( RESISTER SETTING )

CHOOSE BY ⇧ AND ⇩ KEYS AND SELECT DETERMINE KEY

FIG. 9

LIST FOR AUTO PROGRAM RECOMMENDATION DEPENDING ON USER'S PREFERENCE

| 1 | VARIETY | SPECIAL | LATE NIGHT (12:00AM - 5:00AM) |
| 2 | | | |
| 3 | DRAMA | NEW PROGRAM | NOT SPECIFIED |
| 4 | DRAMA | RE-BROADCAST | NOT SPECIFIED |
| 5 | DRAMA | STEREO BROADCAST | NIGHT (6:00PM - 12:00AM) |

CHOOSE BY ⇧ AND ⇩ KEYS AND SELECT FUNCTION BY DETERMINE KEY    END BY TODAY

FIG. 10

LIST FOR AUTO PROGRAM RECOMMENDATION DEPENDING ON USER'S PREFERENCE

| 1 | VARIETY | SPECIAL | LATE NIGHT (12... |
| 2 | | | |
| 3 | DRAMA | NEW PROGRAM | NOT SPECIFIED |
| 4 | DRAMA | RE-BROADCAST | NOT SPECIFIED |
| 5 | DRAMA | STEREO BROADCAST | NIGHT (6:00PM - 12:00AM) |

ALTER SETTING
DELETE SETTING

CHOOSE BY ⇧ AND ⇩ KEYS AND SELECT FUNCTION BY DETERMINE KEY    END BY TODAY

PROGRAM-SELECTION DEVICE, PROGRAM SELECTION METHOD, AND PROGRAM INFORMATION PROVIDING SYSTEM

TECHNICAL FIELD

The present invention relates to program-selecting apparatus and method well applied to, for example, a broadcast receiving set and to a program information providing system.

More particularly, the present invention relates to a program-selecting apparatus etc. for downloading via a communication line from a predetermined server keywords used to set program selection conditions, to thereby enable the program selection conditions to be set by using new keywords without providing input means such as a keyboard for inputting keywords into the apparatus, thus making the apparatus inexpensive.

BACKGROUND ART

For example, in an analog surface-wave broadcast system, it has been proposed that in order to notify viewers of programs provided by broadcast stations, data indicating contents of each of the programs called Electronic Program Guide information (hereinafter referred to as EPG data) should be delivered from a specific one of the broadcast stations periodically. The EPG data comprises information pieces such as a program title, a broadcast date, a broadcast channel, a program explanation and provides a material for the viewers when they determine which one of the programs they view.

In this case, an Integrated Receiver Decoder (IRD) receives EPG data sent periodically from a broadcast station that transmits the EPG data and stores it in a memory, to read out the EPG data from the memory in response to display operations of a viewer so that it may be displayed on an external monitor. It is thus possible for the viewer to determine a program he or she would like to see with visually observing the EPG data displayed on the monitor.

As described above, however, in conventional IRD wherein the EPG data is received and stored in the memory, it has been proposed that if a user has set beforehand program selection conditions each comprising, for example, a genre, a keyword, a time zone, etc., he or she would search the EPG data for a program that matches the program selection condition to record, by subscription, program information of the matched program in a recording medium such as a hard disk drive (HDD).

When a keyword used to set the program selection condition is fixed, it is difficult to set a program selection condition well suited for selecting a user-desired program. A keyword the user would like to use when he or she selects a program varies with the season. Keywords that are expected to be used frequently are, for example, "spring", "cherry blossoms", "picnic", etc., in the case of spring, and "summer", "swimming", "diet", etc. in the case of summer.

To acquire keywords used to set the program selection conditions, it may be thought that input means such as a keyboard should be provided. However, in such a case, it is necessary to provide the keyboard as well as to have, for example, a dictionary function required for kanji character conversion, which leads to a problem of cost increase of the apparatus itself.

DISCLOSURE OF THE INVENTION

It is an object of the present invention to enable program selection conditions to be set by using new keywords without providing input means such as a keyboard for inputting keywords to an apparatus, thus constituting the apparatus inexpensively.

A program-selecting apparatus related to the present invention comprises keyword storage means for storing plural keywords each for use in selection of a program, program selection condition setting means for setting a program selection condition including the keyword selected from the keyword storage means, program extraction means for automatically extracting a program that matches the program selection condition based on received electronic program information, and downloading means for downloading the keyword from a predetermined server via a communication line and writing it into the keyword storage means.

A program selecting method related to the present invention comprises a downloading step for downloading a keyword for selecting a program from a predetermined server via a communication line and writing it in keyword storage means, a program selection condition setting step for setting program selection condition including the keyword selected from the keyword storage means, and a program extracting step for automatically extracting a program that matches the program selection condition based on received electronic program information.

A program information providing system related to the present invention comprises the program selecting apparatus described above, and a server for storing a keyword for program selection and transmitting the keyword according to a request from the program-selecting apparatus.

According to the present invention, plural keywords each for use in selection of a program is stored in the keyword storage means. Then, a program selection condition including the keyword selected from this keyword storage means is set so that a program that matches the program selection condition thus set may be automatically extracted on the basis of received electronic program information. In this case, the keywords are downloaded from a predetermined server via a communication line. It is thus possible to set the program selection conditions by using new keywords without providing input means such as a keyboard used to input keywords into the apparatus.

Note here that the keyword storage means comprises a fixed region in which a predetermined number of preset keywords are stored and an alteration region in which a predetermined number of alterable keywords are stored, in such a configuration that a keyword to be downloaded is stored in the alteration region. It is thus possible to avoid disturbing a user in contrast to a case of altering all the keywords.

Further, the downloading means may be adapted to download a keyword stored beforehand in the server according to a season of the year. Thus, the user has a higher probability of having in the keyword storage means a keyword he would like to use, in setting of the program selection condition in each of the seasons, thereby improving usability for the user.

Further, the downloading means may be adapted to download a keyword from the server either based on user's operations or automatically at a predetermined time interval.

The downloading based on the user's operations allows the download to be carried out only when the user needs it and the keyword is altered in the server before it is downloaded owing to, for example, a change in season, thereby avoiding useless downloading operations to save on a communication fee and also preventing a keyword the user would like to use from being lost against his or her will.

On the other hand, the downloading automatically performed at the predetermined interval allows a keyword to be downloaded and stored in the keyword storage means immediately when the keyword is altered in the server before it is downloaded owing to, for example, a change in season, so that the user can use the keyword.

Further, the program selection condition setting means may be adapted to store plural program selection condition candidates each including genre information of each of the programs and a keyword to extract one of the program selection condition candidates corresponding to a genre selected by a user and set it as the program selection condition. It is thus possible for the user to set the program selection condition only by selecting a genre, thus reducing inconvenience of setting the program selection condition.

Further, a recording medium may also be provided to record data of an extracted program (at least one of voice data and image data). By reproducing the data of a program from this recording medium, contents of this extracted program can be monitored.

Further, program information of an extracted program may be extracted from the electronic program information, to create a list of titles of the extracted programs based on this program information. In this case, programs that match the program selection condition are extracted, so that the title list is updated each time these programs are recorded in the recording medium.

Such a configuration may be provided that this title list is displayed to read out of the recording medium the data of program that corresponds to program information selected by the user from this title list and reproduce it. It is thus possible for the user to specify a predetermined program on the displayed title list, thus obtaining an image or voice of this predetermined program.

DESCRIPTION OF THE PRESENT EMBODIMENTS

Figure 1:
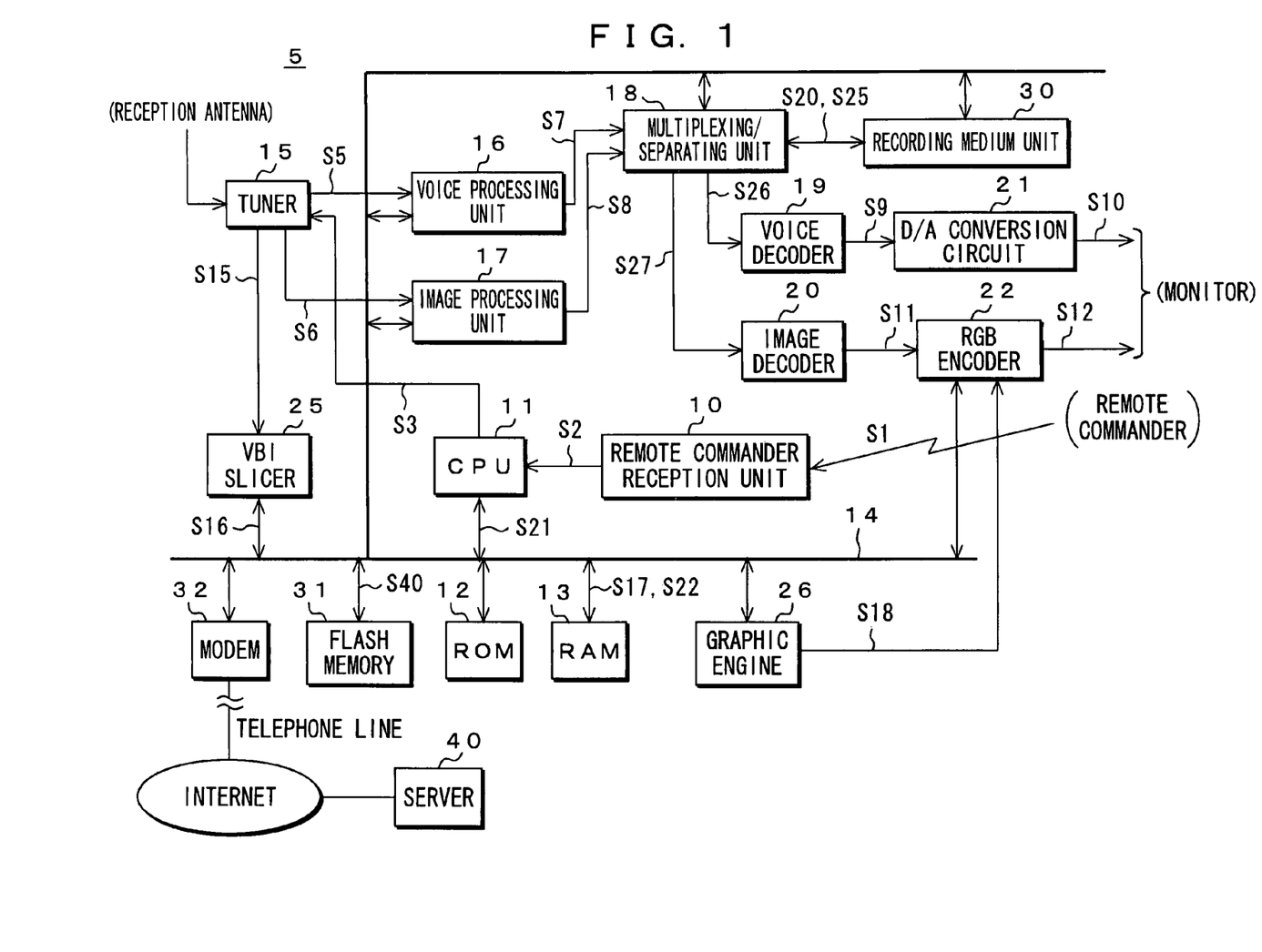
FIG. 1 is a block diagram for showing a configuration of an IRD according to an embodiment.

The following will describe embodiments of the present invention with reference to drawings. FIG. 1 shows a configuration of an Integrated Receiver Decoder (IRD) 5 according to an embodiment. This IRD5 constitutes a receiving apparatus in an analog surface-wave broadcast system.

This IRD5 has a Central Processing Unit (CPU) 11 serving as a system controller for controlling operations of an apparatus as a whole. This CPU11 is connected to a bus 14. To the CPU11 is connected a remote commander reception unit 10. The reception unit 10 receives an instruction signal S1 superimposed on an infrared light with the signal being transmitted from a remote commander and converts the instruction signal S1 into an electric signal to generate an instruction signal S2 and send the instruction signal S2 to the CPU11.

Further, the IRD5 has a Read Only Memory (ROM) 12 storing a control program and the like for controlling operations of the CPU11 and a Random Access Memory (RAM) 13 functioning as a working area for the CPU11 or the like. The ROM12 and the RAM13 are each connected to the bus 14. The CPU11 reads out the control program stored in the ROM12 as occasion demands and transfers the read out control program to the RAM13 wherein it is deployed. Then, the CPU11 reads out the control program thus deployed in the RAM13 and executes it, thereby controlling circuits of the IRD5.

Further, the IRD5 has a tuner 15 for taking out a predetermined broadcast signal selectively from among plural broadcast signals acquired by a reception antenna and demodulates the predetermined broadcast signal to thereby obtain a voice signal and an image signal.

The CPU11 analyzes the instruction signal S2 received from the remote commander reception unit 10 and, if it decides that a user has selected a broadcast station at the remote commander, generates a channel selection signal S3 in accordance with this selection operation and sends it to the tuner 15.

The tuner 15 extracts a broadcast signal of a channel (broadcast station) that corresponds to the channel selection signal S3 from among plural broadcast signals received through the reception antenna and demodulates the extracted broadcast to generate a voice signal S5 and an image signal S6.

Further, the IRD5 has a voice processing unit 16 for performing compression/coding processing on the voice signal to obtain voice-coded data and an image processing unit 17 for performing compression/coding processing on the image signal to obtain an image-coded data. The voice processing unit 16 and the image processing unit 17 are also connected to the bus 14.

The voice processing unit 16 is supplied with the voice signal S5 generated at the tuner 15. The voice processing unit 16 converts the analog voice signal S5 into a digital signal and then performs compression/coding processing on it according to a coding method based on the Moving Picture Experts Group (MPEG) Standards, thus obtaining voice-coded data S7.

The image processing unit 17 is supplied with the image signal S6 generated at the tuner 15. The image processing unit 17 converts the analog image signal S6 into a digital signal and performs compression/coding processing on it according to the coding method based on the MPEG Standards, thus obtaining image-coded data S8.

The IRD5 further has a multiplexing/separating unit 18 and a recording medium unit 30 constituted of, for example, a hard disk drive (HDD). The multiplexing/separating unit 18 and the recording medium unit 30 are also connected to the bus 14.

The multiplexing/separating unit 18 is supplied with the voice-coded data S7 obtained at the voice processing unit 16 and the image-coded data S8 obtained at the image processing unit 17. For recording, the multiplexing/separating unit 18 multiplexes the voice-coded data S7 and the image-coded data S8 to generate multiplexed data S20 and sends it to the recording medium unit 30. The recording medium unit 30 records the multiplexed data S20 in its built-in recording medium. For reproduction, on the other hand, the multiplexing/separation unit 18 is supplied with multiplexed data S25 of a predetermined program reproduced at the recording medium unit 30. The multiplexing/separating unit 18 separates the voice-coded data and the image-coded data from this multiplexed data S25.

Figure 2:
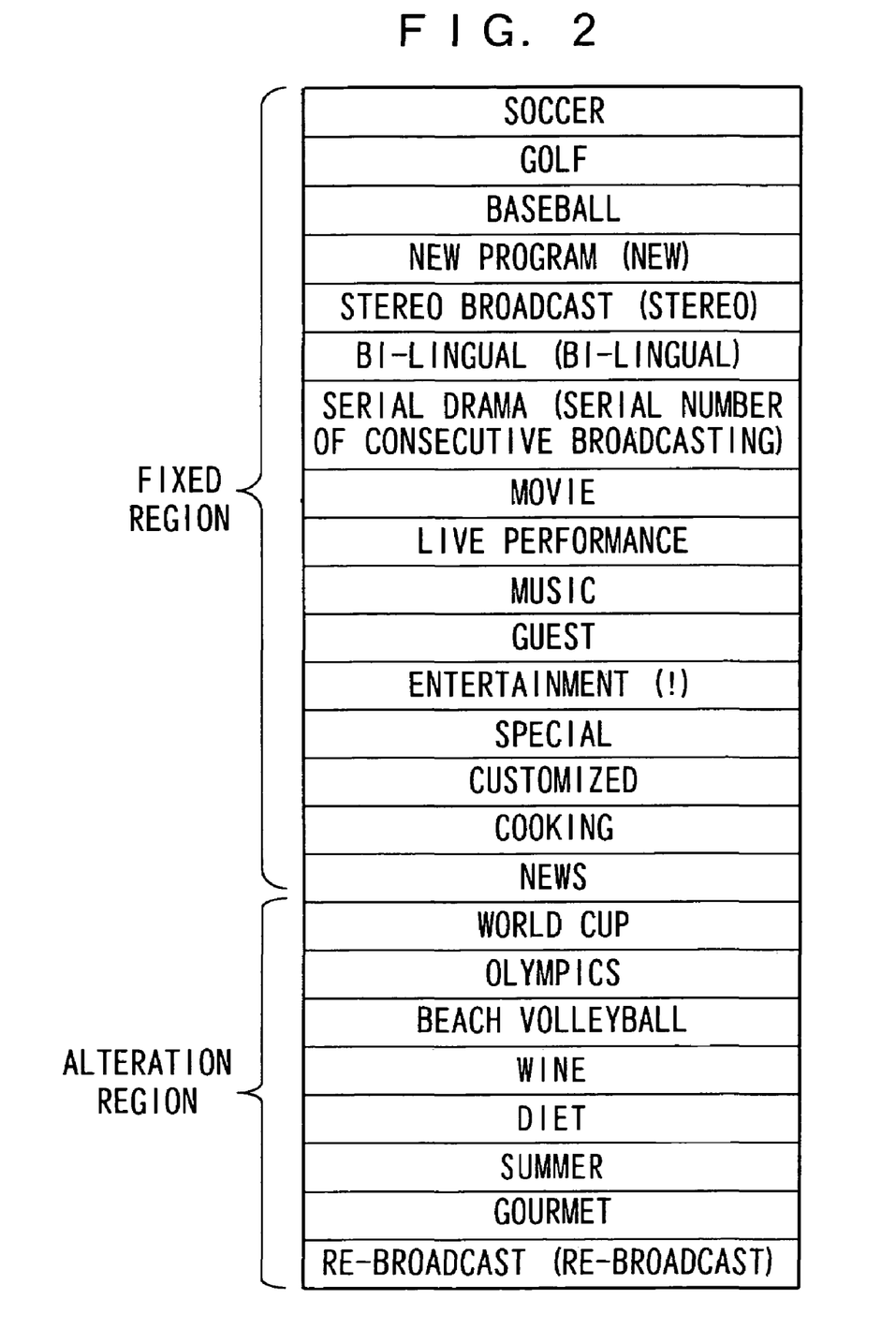
FIG. 2 is a diagram for showing a configuration of a keyword storage region.

It is to be noted that the recording medium built in the recording medium unit 30 is provided with a keyword storage region that constitutes keyword storage means for storing keywords. The keywords are used to set program selection conditions for, for example, automatic picture-recording. In the present embodiment, as shown in FIG. 2, the keyword storage region can store 24 keywords. In this case, 16 keywords are stored in a fixed region in which the keywords cannot be altered, while the remaining eight keywords are stored in an alteration region in which the keywords can be altered.

Into this keyword storage region, 24 keywords are written at the time of, for example, factory shipment. Afterward, the eight keywords recorded in the alteration region are altered by each keyword downloaded from a server in the Internet as described later. It is to be noted that at least some of the keywords stored in the alteration region are supposed to reflect, for example, a currently popular topic or a season, that is, to have a seasonality.

Further, the IRD5 has a voice decoder 19 for performing voice-coded data S26 output from the multiplexing/separating unit 18 to thereby obtain voice data S9 and an image decoder 19 for performing decompression/decoding processing on image-coded data S27 output from the multiplexing/separating unit 18 to thereby obtain image data S11.

The IRD5 further has a D/A conversion circuit 21 and an RGB encoder 22. The RGB encoder 22 is connected to the bus 14. The D/A conversion circuit 21 converts a digital signal of the voice data S9 output from the voice decoder 19 into an analog signal to thereby generate an analog voice signal S10. The RGB encoder 22 converts the image data S11 output from an image decoder 20 into luminance signal and color-difference signal in accordance with, for example, the National Television System Committee (NTSC) Standard and then converts these signals from digital signals into analog signals to thereby generate an image signal S12. The voice signal S10 and the image signal S12 generated by the D/A conversion circuit 21 and the RGB encoder 22 respectively are both supplied to a monitor. The monitor displays an image due to the image signal S12 on its screen and raises voice due to the voice signal S10 from its speaker.

Note here that in an analog surface-wave broadcast system, in order to notify viewers of programs provided from various broadcast stations, explanatory data of the programs called Electronic Program Guide (EPG) data is adapted to be delivered from specific broadcast station(s) periodically.

Figure 3:
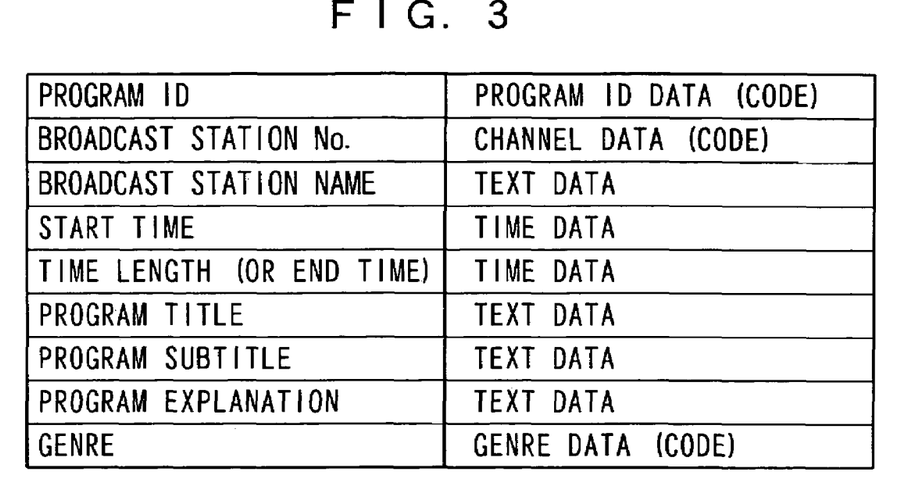
FIG. 3 is a diagram for explaining EPG data.

The EPG data is created for each of the programs and, as shown in FIG. 3, comprises information such as a program Identification (ID) specific to the program, a station number of a transmission-source broadcast station, a station name of the transmission-source broadcast station, a program start time, a program time length (or end time), a program title, a program subtitle that supplements the program title, a program explanation, a program genre, and the like, thus providing a material for the viewers to determine programs that they wish to view. By the way, the program ID, the broadcast station number, and the genre are indicated by code data, the broadcast station name, the program title, the program subtitle, and the program explanation are indicated by text data, and the start time and the time length are indicated by time data.

The specific broadcast station described above superimposes EPG data about, for example, one week of programs on a Vertical Blanking Interval (VBI) of an image signal and periodically transmits it everyday using a time zone such as late night or early morning.

The IRD5 has a VBI slicer 25. This VBI slicer 25 is connected to the bus 14. The tuner 15 extracts a broadcast signal of a channel on which the EPG data is superimposed from plural broadcast signals captured by the reception antenna and demodulates this extracted broadcast signal to thereby generate an image signal S15 and send it to the VBI slicer 25.

The VBI slicer 25 extracts EPG data S16 from the image signal S15 and transfers it via the bus 14 to the RAM13 to store it there. In such a manner, the IRD5 updates the EPG data S16 stored in the RAM13 everyday, to always accumulate the latest EPG data S16 in the RAM13.

Further, the IRD5 has a graphic engine 26 for displaying an EPG screen or a variety of setting screens such as an automatic recording setting screen. The graphic engine 26 is connected to the bus 14.

For example, when a viewer has operated to display the EPG screen using the remote commander, the remote commander transmits to the remote commander reception unit 10 the instruction signal S11 that instructs to display the EPG screen. The remote commander reception unit 10 converts the instruction signal S1 into the instruction signal S2 comprised of an electric signal and sends it to the CPU11.

The CPU11, when detecting that it has been supplied with the instruction signal S2, performs graphic processing on the EPG data S16 on the RAM13 based on dictionary data such as characters and symbols stored in the ROM12, to thereby generate EPG image data S17 and send it via the bus 14 to the graphic engine 26.

The graphic engine 26 converts the EPG screen data S17 into luminance signal and color-difference signal that conform to the NTSC Standard, converts these digital signals into analog signals to thereby generate an EPG screen signal S18, and send it to the RGB encoder 22. The RGB encoder 22 mixes the image signal S12 and the EPG image signal S18 with each other and outputs it to the monitor, to display an EPG screen that corresponds to this EPG image signal S18 on a display screen of the monitor.

Further, the IRD5 has a flash memory 31 for accumulating recorded title list data and the like comprised of a list of programs recorded in the recording medium unit 30. This flash memory 31 is connected to the bus 14.

Furthermore, the IRD5 has a MODEM32 as downloading means for accessing a server 40 connected to the Internet via a telephone line in order to download from the server 40 a keyword stored in the alteration region of the keyword storage region of the recording medium unit 30 as described above.

The following will describe operations of the IRD5 shown in FIG. 1.

First, ordinary reception operations are described.

When a user has selected a broadcast station at the remote commander, the remote commander transmits to the remote commander reception unit 10 the instruction signal S1 that indicates this selection operation. The remote commander reception unit 10 converts this instruction signal S1 into the instruction signal S2 constituted of an electric signal and sends it to the CPU11. The CPU11, when detecting that it has been supplied with this instruction signal S2, generates the channel selection signal S3 in accordance with this selection operation and sends it to the tuner 15.

The tuner 15 extracts a broadcast signal of a channel (broadcast station) in accordance with the channel selection signal S3 from among plural broadcast signals received through the reception antenna and demodulates the extracted broadcast station of the channel to thereby generate the voice signal S5 and the image signal S6 and sends the voice signal S5 to the voice processing unit 16 and the image signal S6 to the image processing unit 17.

The voice processing unit 16 converts the analog voice signal S5 into a digital signal and then performs on it compression/coding processing in accordance with a coding method based on the MPEG Standard and sends the resultant voice-coded data S7 via the multiplexing/separating unit 18 to the voice decoder 19.

The image processing unit 17 converts the analog image signal S6 into a digital signal and then performs on it compression/coding processing in accordance with the coding method based on the MPEG Standard and sends the resultant image-coded data S8 via the multiplexing/separating unit 18 to the image decoder 20.

The voice decoder 19 performs decompression/decoding processing on the voice-coded data S26 and sends the resultant voice data S9 to the D/A conversion circuit 21. The D/A conversion circuit 21 converts this voice data S9 from digital signal into an analog signal to thereby generate the voice signal S10 and output this voice signal S10 to the monitor.

The image decoder 20 performs decompression/decoding processing on the image-coded data S27 and sends the resultant image data S11 to the RGB encoder 22. The RGB encoder 22 converts the image data S11 into luminance signal and color-difference signal in accordance with NTSC Standard, converts the digital signals into the analog signals to thereby generate the image signal S12 and output this image signal S12 to the monitor.

In such a manner, an image of the channel selected by the user is displayed on the display screen of the monitor and voice of the user-selected channel is raised from a speaker of the monitor. Subsequently, by operations similar to those described above, when the user has changed a channel based on the selecting operation at the remote commander, an image of the changed channel is displayed on the display screen of the monitor and voice of the changed channel is raised from the monitor speaker.

The following will describe recording and reproducing operations.

When the user has performed operations to record an image and voice of a program at the remote commander, the remote commander transmits the instruction signal S1 for performing recording operations to the commander reception unit 10. The remote commander reception unit 10 converts this instruction signal S1 into the instruction signal S2 constituted of an electric signal and sends it to the CPU11.

The CPU11, when detecting that it is supplied with this instruction signal S2, controls the various circuits through the bus 14 to thereby controlling the various units so that the image and the voice specified at the remote commander may be recorded. In this case, the multiplexing/separating unit 18 multiplexes the voice-coded data S7 obtained through the tuner 15 and the voice processing unit 16 sequentially and the image-coded data S8 obtained through the tuner 15 and the image processing unit 17 sequentially to thereby generate the multiplexed data S20 and transfer it to the recording medium unit 30 in order to record it in a built-in recording medium (not shown).

In this case, if CPU11 decides that recording of a program specified by the user is completed, the CPU11 generates recorded title list data S21 comprised of a list of programs recorded in the recording medium unit 30, based on the EPG data S16 stored in the RAM13 beforehand, and stored it in the flash memory 31. The CPU11 is adapted to update the recorded title list data S21 each time a new program is recorded in the recording medium unit 30, thus always accumulating the latest recorded title list data S21 in the flash memory 31.

If, in this condition, the user performs operations at the remote commander to display a recorded title list screen, the remote commander transmits the instruction signal S1 for displaying the recorded title list screen to the remote commander reception unit 10. The remote commander reception unit 10 converts this instruction signal S1 into the instruction signal S2 constituted of an electric signal and sends it to the CPU11.

The CPU11, when detecting that it has been supplied with the instruction signal S2, transfers the recorded title list data S21 to the RAM13 to perform graphic processing on the recorded title list data S21 on the RAM13 based on the dictionary data such as characters and symbols stored in the ROM12, in order to generate recorded title list screen data S22 and send it via the bus 14 to the graphic engine 26.

The graphic engine 26 converts the recorded title list screen data S22 into analog luminance signal and color-difference signal that conform to the NTSC Standard, converts the digital signals into the analog signals, thereby generate a recorded title list image signal S23 and send it to the RGB encoder 22. The RGB encoder 22 mixes the image signal S12 and the recorded title list screen signal S23 with each other and outputs it to the monitor, to display a recorded title list screen in accordance with this recorded title list screen signal S23 on the display screen of the monitor.

If, then, the user performs operations to reproduce an image and voice of his or her desired program at the remote commander with him or her visually observing the recorded title list screen displayed on the display screen of the monitor, the remote commander transmits the instruction signal S1 for reproduction to the remote commander reception unit 10. The remote commander reception unit 10 converts this instruction signal S1 into the instruction signal S2 constituted of an electric signal and sends it to the CPU11.

The CPU11, when detecting that it has been supplied with this instruction signal S2, controls the various circuits via the bus 14 to thereby reproduce the image and the voice of the program specified at the remote commander. That is, the recording medium 30 reproduces multiplexed data S25 of the specified program from multiplexed data of plural programs recorded in the built-in recording medium (not shown) and sends it to the multiplexing/separating unit 18.

The multiplexing/separating unit 18 separates the multiplexed data S25 into the voice-coded data S26 and the image-coded data S27 and then sends this voice-coded data S26 through the voice decoder 19 and the D/A conversion circuit 21 sequentially to generate a voice signal S10 and output it to the monitor and also sends the image-coded data S27 through the image decoder 20 and the RGB encoder 22 sequentially to generate an image signal S12 and send it to the monitor.

In such a manner, in a process of reproduction of the multiplexed data S25 of a predetermined program obtained from the recording medium unit 30 in accordance with a user's instruction, an image of the predetermined program is displayed on the monitor's display screen and voice of the predetermined program is output from the monitor's speaker.

The following will describe operations for automatic picture-recording.

Automatic picture-recording can be set in a condition where a simple setting screen is displayed on the monitor. When the user has performed operations for simple setting at the remote commander, the CPU11 generates the screen data S22 of the simple setting screen and sends it via the bus 14 to the graphic engine 26. The graphic engine 26 generates the simple setting screen signal S23 and sends it to the RGB encoder 22, thereby displaying the simple setting screen on the monitor.

Figure 4:
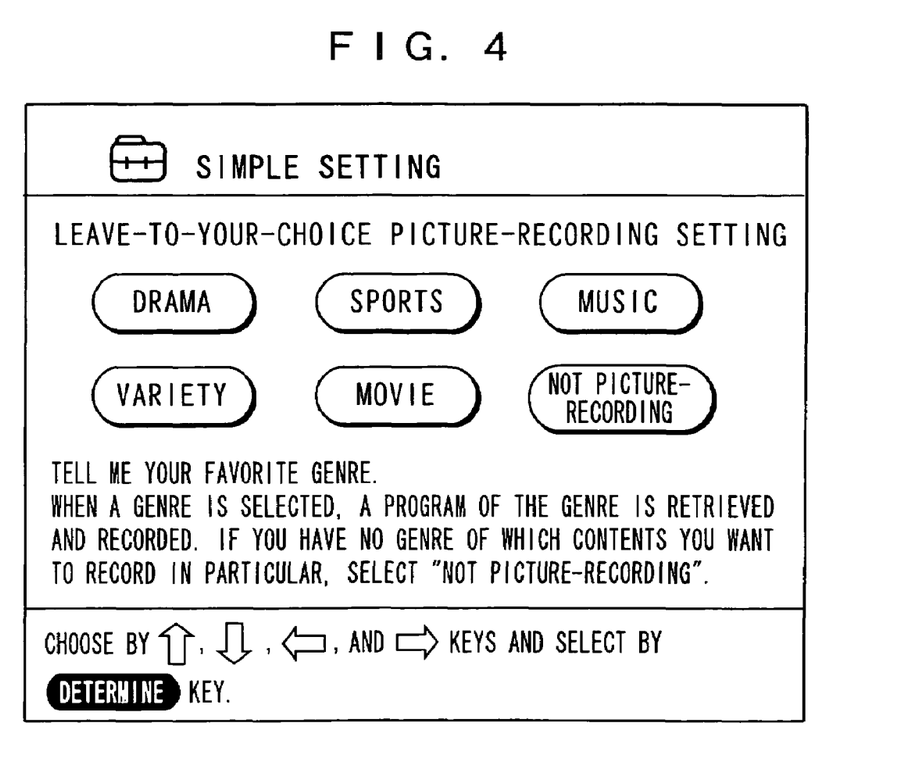
FIG. 4 is an illustration for showing a simple setting screen.

FIG. 4 shows one example of the simple setting screen displayed on the monitor. By this simple setting, it is possible to select a genre such as "drama", "sports", "music", "variety", "movie", and "not to set picture-recording". If any one of "drama", "sports", "music", "variety", and "movie" is selected, setting is made to perform automatic picture-recording, whereas if "not to set picture-recording", setting is made not to perform automatic picture-recording.

Figure 5:
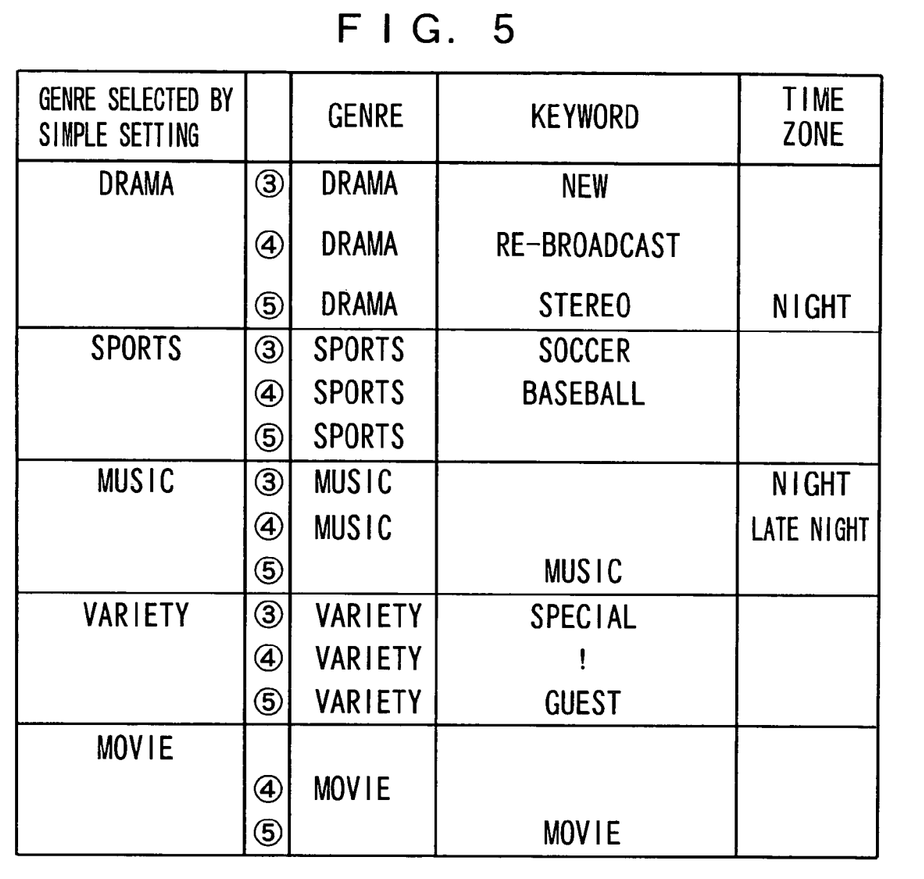
FIG. 5 is a diagram for showing program selection condition candidates for each genre.

It is to be noted that for each of the genres that can be selected by simple setting such as "drama", "sports", "music", "variety", and "movie", program selection condition candidates are prepared beforehand. Data of the program selection condition candidates for each of the genres is stored in a particular storage region of the recording medium unit 30 at the time of, for example, factory shipment. FIG. 5 shows one example of the program selection condition candidates for each of the genres.

There are prepared program selection condition candidates having a priority (3) (priority order 3) in a case where the genre is "drama", the keyword is "new program", and the time zone is "not specified", program selection condition candidates having a priority (4) (priority order 4) in a case where the genre is "drama", the keyword is "re-broadcast", and the time zone is "not specified", and program selection condition candidates having a priority (5) (priority order 5) in a case where the genre is "drama", the keyword is "stereo", and the time zone is "night", in such a configuration that each of the program selection condition candidates is registered as a program selection condition in, for example, a region for auto program recommendation depending on user's preference in the flash memory 31.

Figure 6:
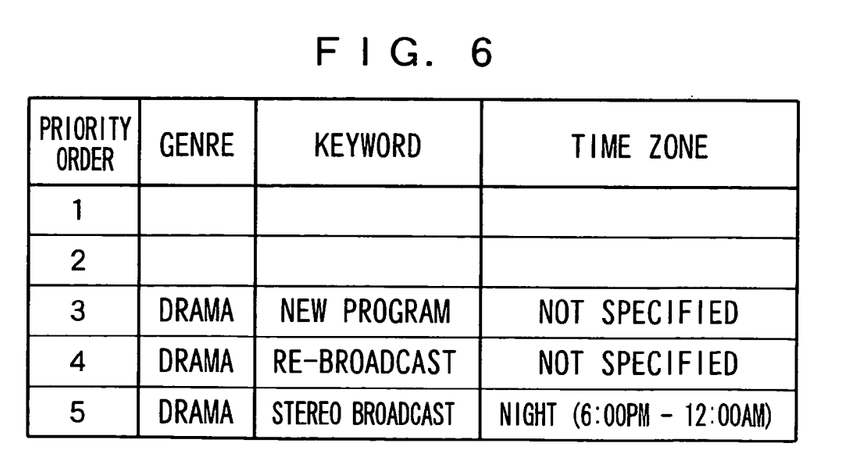
FIG. 6 is a diagram for showing registered situation in a region for auto program recommendation depending on user's preference.

FIG. 6 shows registered situation in the region for auto program recommendation depending on user's preference in the flash memory 31 where "drama" is selected on the simple setting screen. The registered situation in the region for auto program recommendation depending on user's preference in the flash memory 31 can be displayed as a list representation on the monitor when the user has performed operations on a list for auto program recommendation depending on user's preference at the remote commander.

Figure 7:
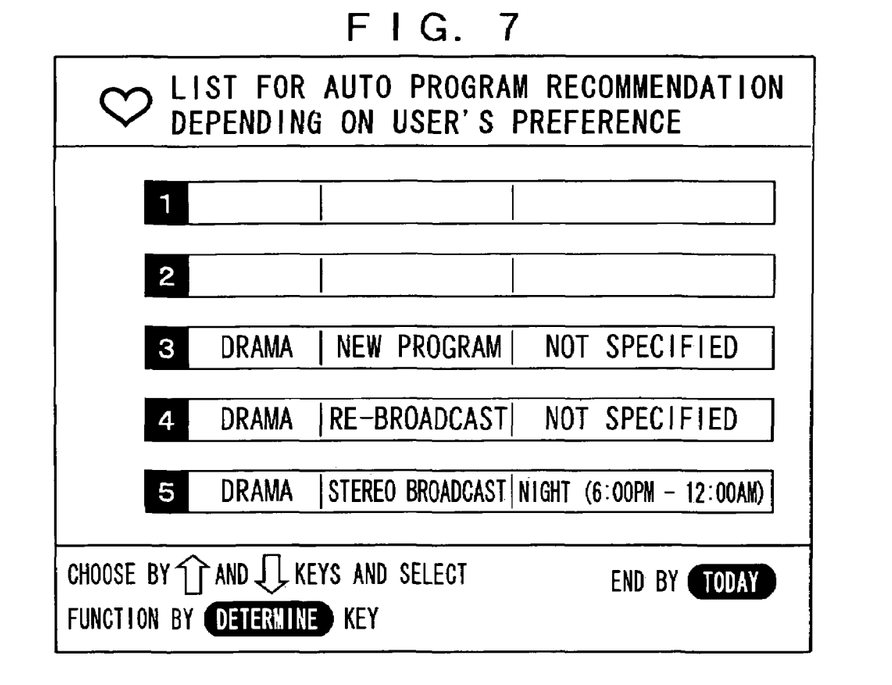
FIG. 7 is an illustration for showing an example of displaying a list for auto program recommendation depending on user's preference.

When the user has performed the operations on the list for the auto program recommendation depending on user's preference at the remote commander, the CPU11 generates the screen data S22 of the list for auto program recommendation depending on user's preference based on the registered situation in the region for auto program recommendation depending on user's preference in the flash memory 31 and sends it via the bus 14 to the graphic engine 26. The graphic engine 26 generates the list screen signal S23 for auto program recommendation depending on user's preference and sends it to the RGB encoder 22, to display a list screen for auto program recommendation depending on user's preference on the monitor. FIG. 7 shows one example of displaying the list for auto program recommendation depending on user's preference.

Further, in the present embodiment, the user allows a program selection condition to be newly set besides those that are set on the simple setting screen described above. This new setting can be performed in a condition where the picture-recording setting screen for auto program recommendation depending on user's preference is displayed on the monitor. When the user has performed operations for new setting at the remote commander, the CPU11 generates the screen data S22 of the picture-recording setting screen for auto program recommendation depending on user's preference and sends it via the bus 14 to the graphic engine 26. The graphic engine 26 generates the picture-recording setting screen signal S23 for auto program recommendation depending on user's preference and sends it to the RGB encoder 22, to display the picture-recording setting screen for auto program recommendation depending on user's preference on the monitor.

Figure 8:
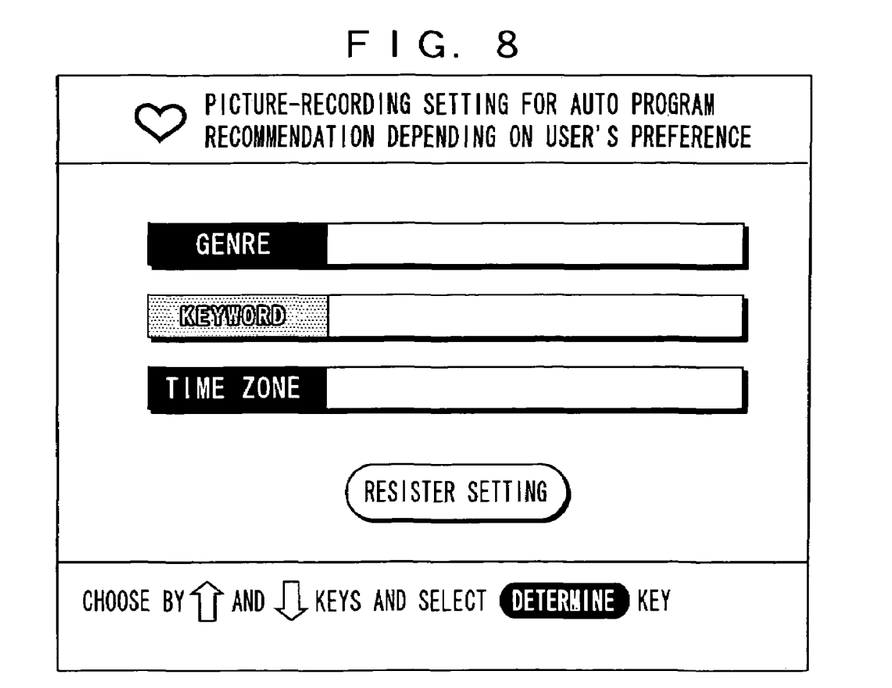
FIG. 8 is an illustration for showing a picture-recording setting screen for auto program recommendation depending on user's preference.

FIG. 8 shows one example of the picture-recording setting screen for auto program recommendation depending on user's preference displayed on the monitor. By this procedure for newly setting, the items "genre", "keyword", and "time zone" can be selected and set individually. In this case, "keyword" can be set by specifying any keyword recorded in the keyword storage region of the recording medium unit 30 described above.

Each time one program selection condition is set by this newly setting procedure, it is registered in order in the storage unit starting from that of the priority order 1 in the region for auto program recommendation depending on user's preference in the flash memory 31. For example, a program selection condition set first is registered to have the highest priority order 1 and that set second is registered to have the second highest priority order 2.

Figure 9:
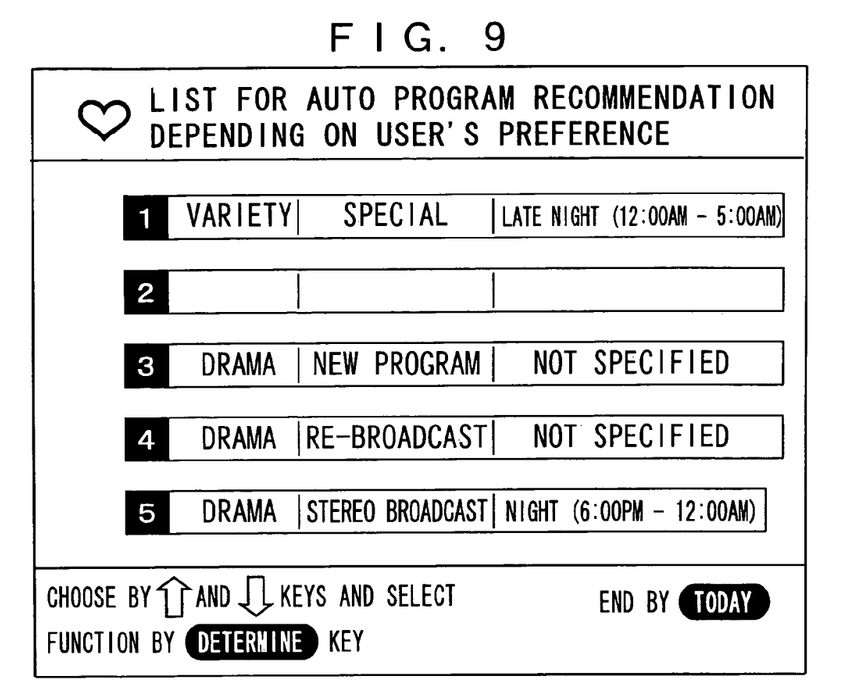
FIG. 9 is an illustration for showing an example of displaying the list for auto program recommendation depending on user's preference.

FIG. 9 shows an example of displaying the list for auto program recommendation depending on user's preference in a case where first the genre is set to "variety", the keyword is set to "special", and the time zone is "late night" on the picture-recording setting screen for auto program recommendation depending on user's preference shown in FIG. 8. It is to be noted that in the figure the priority orders 3-5 have been registered when the user has selected "drama" on the simple setting screen described above.

By thus registering the program selection condition in the region for auto program recommendation depending on user's preference in the flash memory 31, setting is made so that automatic picture-recording may be performed. Therefore, even if the user has selected "not to set picture-recording" on the simple setting screen to prevent the automatic picture-recording from being performed, the automatic picture-recording is set when the program selection condition is set and registered on the picture-recording setting screen for auto program recommendation depending on user's preference.

Further, in the present embodiment, by selecting an item of an arbitrary program selection condition in a condition where the list for auto program recommendation depending on user's preference is displayed, contents of the item can be deleted or altered for edition.

Figure 10:
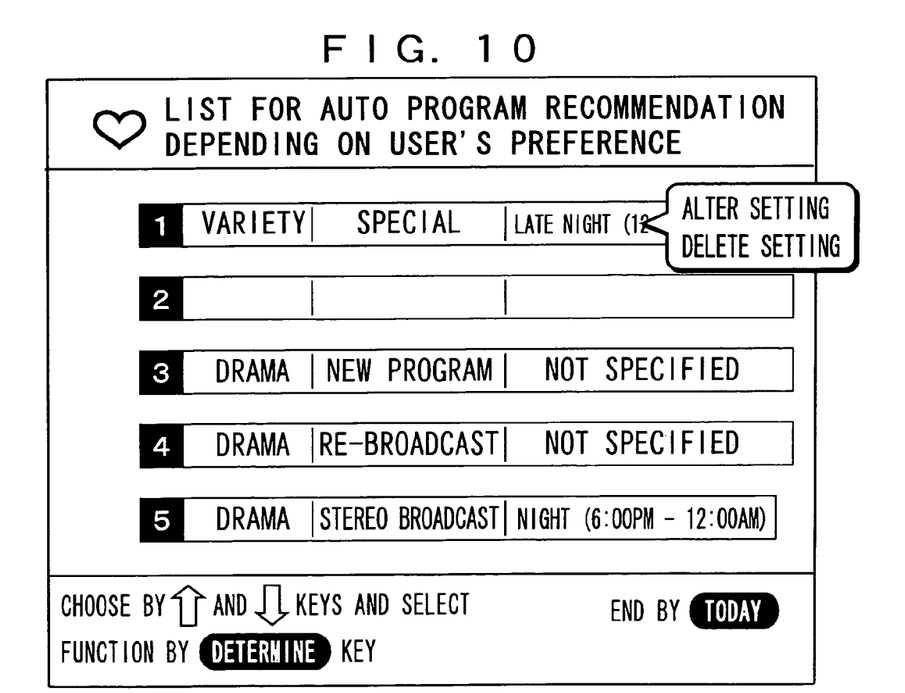
FIG. 10 is an illustration for showing an example of displaying the list for auto program recommendation depending on user's preference.

FIG. 10 shows a display example in a case where an item of a program selection condition having the priority order 1 is selected in the example of displaying the list for auto program recommendation depending on user's preference shown in, for example, FIG. 9. In this case, on this item, either "Delete setting" or "Alter setting" can be selected.

Figure 11:
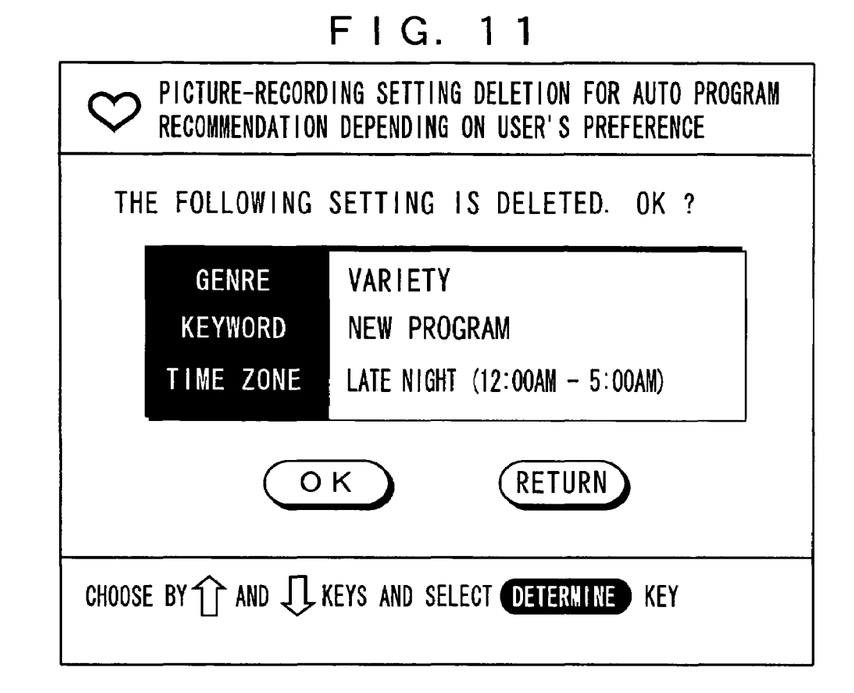
FIG. 11 is an illustration for showing a picture-recording setting deletion screen for auto program recommendation depending on user's preference.

FIG. 11 shows a picture-recording setting deletion screen for auto program recommendation depending on user's preference displayed when an edit item whose setting is to be deleted is selected. In this case, when the user has performed operations for deletion at the remote commander, the CPU11 generates the screen data S22 of a picture-recording setting deletion screen for auto program recommendation depending on user's preference and sends it via the bus 14 to the graphic engine 26. The graphic engine 26 generates the picture-recording setting deletion image signal S23 for auto program recommendation depending on user's preference and sends it to the encoder 22, to display the picture-recording setting deletion screen for auto program recommendation depending on user's preference on the monitor. If "OK" is selected on this picture-recording setting deletion screen for auto program recommendation depending on user's preference, an item of the relevant program selection condition is deleted from the region for auto program recommendation depending on user's preference in the flash memory 31. On the other hand, if "RETURN" is selected, nothing is deleted, so that the process returns to a condition where the list for auto program recommendation depending on user's preference is displayed.

Figure 12:
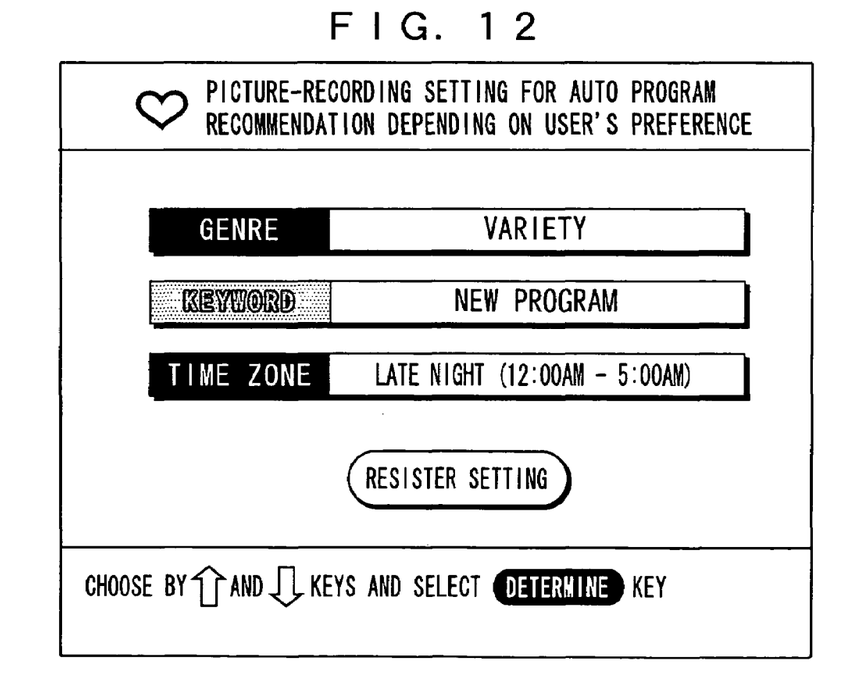
FIG. 12 is an illustration for showing a picture-recording setting screen for auto program recommendation depending on user's preference.

FIG. 12 shows the picture-recording setting screen for auto program recommendation depending on user's preference displayed when an edit item whose setting is to be altered is selected. In this case, when the user has performed operations for alteration at the remote commander, the CPU11 generates the screen data S22 of the picture-recording setting screen for auto program recommendation depending on user's preference and sends it via the bus 14 to the graphic engine 26. The graphic engine 26 generates the picture-recording setting image signal S23 for auto program recommendation depending on user's preference and sends it to the RGB encoder 22, to display the picture-recording setting screen for auto program recommendation depending on user's preference on the monitor. On this picture-recording setting screen for auto program recommendation depending on user's preference, it is possible to arbitrarily alter the items of "genre", "keyword", and "time zone" and register them.

The following will describe operations to be performed in a case where, as described above, program selection conditions are registered in the region for auto program recommendation depending on user's preference in the flash memory 31 so that automatic picture-recording may be performed.

In this case, the CPU11 retrieves periodically, for example, every day, a program that corresponds to a program selection condition registered in the region for auto program recommendation depending on user's preference in the flash memory 31, based on the EPG data S16 stored in the RAM13 beforehand. If, in this case, programs that correspond to any plural program selection conditions conflict in terms of broadcast time, a program having a higher priority order is selected. The CPU11 stores in the RAM13 information about the automatic picture-recording programs thus retrieved, that is, information such as a program title, a broadcast station number, a start time, a time length (or end time) as picture-recording reservation information.

Then, based on the picture-recording reservation information of the automatic picture-recording programs stored in the RAM13, the CPU11 selects a broadcast station using the tuner 15 on a relevant day, controls the operations of the recording medium unit 30 and the like, and records the multiplexed data S20 related to this automatic picture-recording programs in the built-in recording medium (not shown) of the recording medium unit 30. If, in this case, the CPU11 decides that recording of the relevant program is ended, it updates the recorded title list data S21 and accumulates the recorded title list data S21 in the flash memory 31.

The following will describe operations to download a keyword using the MODEM32. The keyword is downloaded based on, for example, operations of the user using the remote commander.

When operations are performed to download a keyword at the remote commander, the remote commander transmits to the remote commander reception unit 10 the instruction signal S1 indicating the keyword downloading operation. The remote commander reception unit 10 converts this instruction signal S1 into the instruction signal S2 constituted of an electric signal and sends it to the CPU11. The CPU11, when detecting that it has been supplied with this instruction signal S2, supplies the MODEM32 with a control signal for downloading the keyword.

The MODEM32 accesses the server 40 connected to the Internet via a telephone line, to download the keyword. The keyword downloaded via the MODEM32 is written into the alteration region of the keyword storage region of a recording medium built in the recording medium unit 30 as described above. The keyword thus written is used to set program selection conditions for, for example, setting an automatic picture-recording as described above.

Although not described above, it is to be noted that keywords stored anywhere in the keyword storage region including those stored in this alteration region are also used as a keyword when retrieving a program that corresponds to the keyword based on the EPG data stored in the RAM13. Further, the keyword downloading may be performed automatically at a predetermined interval of, for example, a day rather than based on the user's operations at the remote commander as described above. Every downloading is supposed to be performed the same way as it is performed on the basis of the above-mentioned user's operations.

Further, the keyword to be stored in the server 40 and downloaded is supposed to reflect a currently popular topic or a season as described above such as "spring", "cherry blossoms", or "picnic" in spring and "summer", "swimming", or "diet" in summer, that is to have a seasonality. Further, keywords representing a highly popular current topic such as "the Olympics" or "the Nobel Prize" can also be saved in the server 40 and downloaded according thereto.

For this purpose, the keywords in the server 40 are updated at an update frequency of once every two to three months, for example. In this case, the user may input characters through a personal computer or a cellular phone so that a keyword to be downloaded by his IRD5 can be registered in the server 40. This enables the user to download from the server 40 a keyword he or she wants to use. In a case where a keyword is registered in the server 40 in such a manner, the user is to input a user ID and a password that are required to identify him or her. Although not described above, it is to be noted that inputting a user ID or a password is necessary even for downloading a keyword through the MODEM32.

As described above, in the present embodiment, a keyword used to set the program selection condition in, for example, the automatic picture-recording is downloaded from the server 40 connected to the Internet through the MODEM32 and written into the keyword storage region of the recording medium built in the recording medium unit 30 and held there. Therefore, the program selection condition can be set using a new keyword without providing input means such as a keyboard for inputting keywords to the apparatus, thus making the apparatus inexpensive.

Further, in the present embodiment, the keyword storage region is configured to have a fixed region where, for example, 16 keywords are stored and an alteration region in which, for example, alterable eight keywords are stored so that any of the keywords to be downloaded may be stored in the alteration region. Therefore, the user is not disturbed as compared with a case where all the keywords stored in the keyword storage region are altered to the downloaded keywords.

Further, in the present embodiment, at least some of the keywords downloaded are supposed to be those in accordance with seasonality. Therefore, the user has a higher probability of his or her having in the keyword storage region a keyword he or she would like to use for program selection condition setting in a certain season, thus improving his or her ease-to-use.

Further, in the present embodiment, downloading of a keyword through the MODEM 32 is performed on the basis of user's operations, for example, at the remote commander or automatically at a predetermined interval. In a case where it is performed on the basis of the user's operations, the downloading may be performed only when the keyword in the server 40 to be downloaded is altered due to, for example, a change in season and the user needs it, thus saving on a communication fee by avoiding useless downloading and also preventing a desired keyword from being lost against his will.

In a case where it is done automatically at a predetermined interval, on the other hand, a keyword in the server 40 to be downloaded, if altered due to, for example, a change in season, can be downloaded and stored in the keyword storage region immediately, to be used by the user.

Further, in the present embodiment, beforehand there are prepared plural program selection condition candidates (each of which comprises a genre, a keyword, and a time zone) each having a priority for genres that can be set in simple setting of "drama", "sports", "music", "variety", and "movie". Therefore, it is necessary for the user only to select a genre in order to set plural program information selection conditions having priorities, thus reducing inconvenience of setting the program selection condition.

Further, in the present embodiment, besides the plural program selection conditions registered in the region for auto program recommendation depending on user's preference in the flash memory 31 in simple setting, a new program selection condition can be added and further, it is possible to change contents of an item of any of the program selection conditions selected in a condition where the list for auto program recommendation depending on user's preference is displayed. Therefore, the user can set program selection conditions for selecting his desired program more appropriately.

Further, in the present embodiment, the recording medium unit 30 is provided for recording multiplexed data as data of a program that matches a program selection condition, so that by reproducing the multiplexed data from this recording medium unit 30, it is possible to monitor contents of the program that matches the program selection condition.

Further, in the present embodiment, each time the program data (multiplexed data) that matches the program selection condition is recorded in the recording medium unit 30, the recorded title list data S21 is updated. A screen based on this recorded title list data S21 can be displayed on the monitor, so that the user can specify a predetermined program on a displayed title list to read out data of the predetermined program from the recording medium unit 30 and reproduce it.

Although the embodiment described above has applied the present invention to the IRD 5, of course the present invention can be similarly applied to any other program selecting apparatus.

Further, although the embodiment described above has recorded multiplexed data, that is, voice data and image data in the recording medium unit, the present invention is not limited to it. There may be a case where program data comprises only voice data or image data, in which case only the voice data or the image data is recorded as the program data in the recording medium unit. Further, even in a case where the program data comprises voice data and image data, only the voice data or the image data might be recorded according to user's selection.

Further, according to the present invention, a keyword used to set the program selection condition is downloaded from a predetermined server via a communication line, so that the program selection condition can be set using a new keyword without providing input means such as a keyboard for inputting keywords to the apparatus, thus making the apparatus inexpensive.

INDUSTRIAL APPLICABILITY

As described above, program selecting apparatus and method and a program information providing system related to the present invention are well applied to, for example, a broadcast receiving set.

The invention claimed is:

1. A program information extraction apparatus comprising:
    keyword storage means for storing plural keywords for setting a program selection condition, said keyword storage means including a fixed region in which a predetermined number of fixed keywords are stored and an alteration region in which a predetermined number of alterable keywords are stored, said keyword storage means preventing any alteration of the fixed region;
    downloading means for downloading said keyword from a predetermined server via a communication line;
    keyword writing means for writing said keyword downloaded by said downloading means into the alteration region of said keyword storage means; and
    program information extraction means for extracting program information for a program that matches a program selection condition set using said keyword stored in said keyword storage means.

2. The program information extraction apparatus according to claim 1, further comprising:
    program selection condition setting means for setting a program selection condition including said keyword stored in said keyword storage means,
    wherein said program information extraction means extracts program information of the program that matches the program selection condition set in said program selection condition setting means.

3. The program information extraction apparatus according to claim 1, wherein said downloading means downloads a keyword stored beforehand in said server according to any one of seasonal and high profile topics.

4. The program information extraction apparatus according to claim 1, wherein said downloading means downloads said keyword from said server based on user's operation.

5. The program information extraction apparatus according to claim 1, wherein said downloading means automatically downloads said keyword from said server at a predetermined interval.

6. The program information extraction apparatus according to claim 2, wherein said program selection condition setting means stores plural program selection condition candidates each including genre information of each program and said keyword, extracts one of said plural program selection condition candidates, said extracted candidate corresponding to a genre selected by a user, and sets said extracted candidate as a program selection condition.

7. The program information extraction apparatus according to claim 1, further comprising a recording medium for recording data of said extracted program.

8. The program information extraction apparatus according to claim 7, wherein said program information extraction means extracts program information of said extracted program from said electronic program information and, based on said program information, creates a title list of said extracted program.

9. The program information extraction apparatus according to claim 8, wherein said program information extraction means updates said title list each time a program that matches a program selection condition is extracted and data of said program is recorded in said recording medium.

10. The program information extraction apparatus according to claim 8, further comprising program reproduction means for displaying said title list and reading out of said recording medium, data of a program that corresponds to program information selected by a user from said title list to reproduce said data.

11. A program information providing system comprising:
a program information extraction apparatus according to claim 1; and
a server for storing a keyword used for selecting a program and transmitting said keyword according to a request from said program selecting apparatus.

12. The program information providing system according to claim 11, wherein said server stores a keyword in accordance with any one of the seasonal and high profile topics and transmits said keyword to said program selecting apparatus.

13. A program information extraction method comprising:
downloading a keyword for selecting a program from a predetermined server via a communication line and writing said keyword into keyword storage, said keyword storage including a fixed region in which a predetermined number of fixed keywords are stored and an alteration region in which a predetermined number of alterable keywords are stored;
preventing any alteration of the fixed region;
writing said keyword downloaded by said downloading means into the alteration region of said keyword storage; and
extracting program information for a program that matches a program selection condition set using said keyword stored in said keyword storage.

14. The program information extraction method according to claim 13, wherein, in said downloading, the keyword stored in said server as to correspond to any one of seasonal and high profile topics is downloaded and written into said keyword storage.

15. A program information extraction apparatus comprising:
a program selection condition setting unit configured to set a program selection condition including at least a keyword;
a keyword storage unit configured to store plural keywords used for setting a program selection condition in said program selection condition setting unit, said keyword storage unit including a fixed region in which a predetermined number of fixed keywords are stored and an alteration region in which a predetermined number of alterable keywords are stored, said keyword storage unit configured to prevent any alteration of the fixed region;
a downloading unit configured to download said keyword from a predetermined server via a communication line;
a keyword writing unit configured to write said keyword downloaded by said downloading unit into the alteration region of said keyword storage unit; and
a program information extraction unit configured to extract program information that matches said program selection condition set by said program selection condition setting unit; and
wherein said program selection condition setting unit is configured to store plural program selection condition candidates each including genre information of each program and said keyword, to extract one of said plural program selection condition candidates, said extracted candidate corresponding to a genre selected by a user, and to set said extracted candidate as a program selection condition.

16. A program information extraction apparatus comprising:
a keyword storage unit configured to store plural keywords each for use in selection of a program, said keyword storage unit including a fixed region in which a predetermined number of fixed keywords are stored and an alteration region in which a predetermined number of alterable keywords are stored, said keyword storage unit configured to prevent any alteration of the fixed region;
a downloading unit configured to download said keyword from a predetermined server via a communication line;
a keyword writing unit configured to write said keyword downloaded by said downloading unit into the alteration region of said keyword storage unit; and
a program information extraction unit configured to extract program information for a program that matches a program selection condition set using said keyword stored in said keyword storage unit.

17. The program information extraction apparatus according claim 16, further comprising:
a program selection condition setting unit configured to set a program selection condition including said keyword stored in said keyword storage unit,
wherein said program information extraction unit is configured to extract program information of the program that matches the program selection condition set in said program selection condition setting unit.

18. The program information extraction apparatus according claim 16, wherein said downloading unit is configured to download a keyword stored beforehand in said server according to any one of seasonal and high profile topics.

19. The program information extraction apparatus according to claim 16, wherein said downloading unit is configured to download said keyword from said server based on user's operation.

20. The program information extraction apparatus according to claim 16, wherein said downloading unit is configured to automatically download said keyword from said server at a predetermined interval.

* * * * *